April 28, 1931.  D. SORGE  1,802,448
PICTURE, DECORATIVE PANEL AND SURFACE, PLAQUE, AND THE LIKE
Filed Jan. 4, 1929
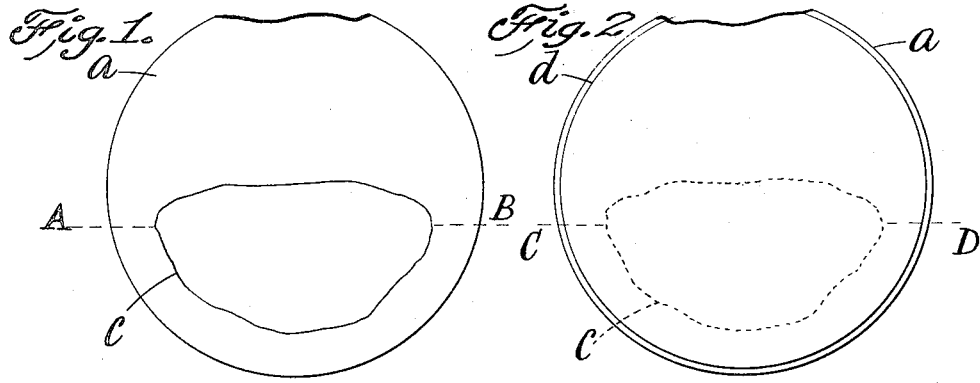
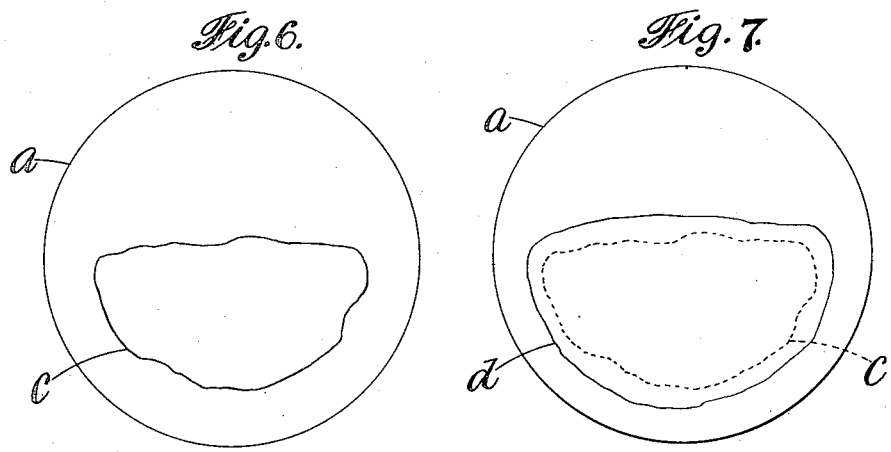
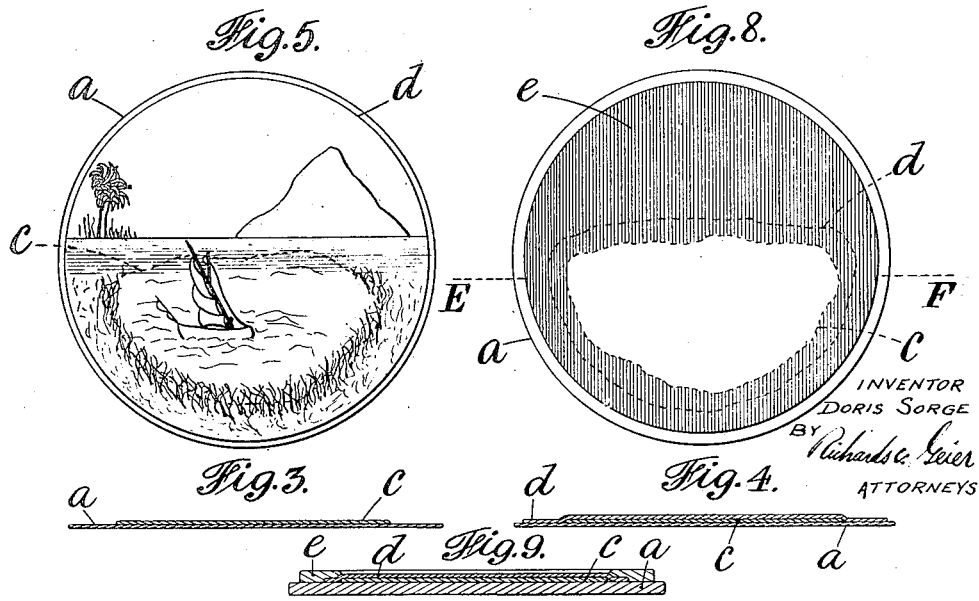
INVENTOR
DORIS SORGE
BY Richards & Geier
ATTORNEYS Patented Apr. 28, 1931

1,802,448

UNITED STATES PATENT OFFICE

DORIS SORGE, OF WYLDE GREEN, NEAR BIRMINGHAM, ENGLAND

PICTURE, DECORATIVE PANEL AND SURFACE, PLAQUE, AND THE LIKE

Application filed January 4, 1929, Serial No. 330,204, and in Great Britain January 4, 1928.

The invention provides the hereinafter described and claimed improvements in pictures, decorative panels and surfaces, plaques and the like having a part of them real butterfly wing, gold leaf or like highly decorative substance which is extremely delicate both for handling and preserving.

In order that a clear conception of my invention be attained and the advantages thereof adequately realized it is desirable to remark that pictures have hitherto been produced by painting or otherwise fixing upon the back of a glass sheet a view or subject having defined transparent or substantially transparent spaces forming material parts of the picture which spaces are subsequently filled in with real butterfly wing to produce a decorative effect, the wing being placed upon a backing to which a mount is applied to connect the glass sheet to the backing and hold the butterfly wing in position against the spaces referred to. It has been proposed to form a label partly constituted by a complete butterfly by enclosing the latter in a cavity formed in the wall of a bottle and subsequently applying a pane of glass to the cavity by the application of adhesive around the edge of the glass pane to keep the specimen in good condition.

My invention is concerned with the production of pictures wherein butterfly wing or the like is used for obtaining a highly decorative effect, and according to the invention real butterfly wing or the like is disposed between a backing, having a uniform surface, and a transparent facing sheet also having a uniform surface permanently applied to each other in close proximity to and beyond the boundary of the wing or the like by adhesive so that said wing or the like is fixed between said backing and facing sheet by the intimate attachment of the two latter by adhesive around and beyond the boundary of the wing, thus enclosing the wing closely and flatly in an air-tight manner.

The backing may be of transparent, translucent or opaque material, but in every instance the facing is sufficiently transparent to show the butterfly wing therethrough and may conveniently be a very thin sheet of celluloid or tissue; it being clearly understood that the adhesive is only applied beyond the butterfly wing and not to the butterfly wing where it is viewed through the facing or even at the back, although the extreme boundary edge of the butterfly wing may, if desired, be temporarily stuck down to the backing by an adhesive while the facing is properly applied.

If the backing is transparent or translucent the back of it may be painted or otherwise decorated as also may be the front of the transparent facing and if the backing is opaque the facing at the front beyond the butterfly wing may be treated with a very thin coating of cement or other substance, which in turn can be painted or decorated, all with the object of producing an effective picture or the like of which the real butterfly wing or the like forms an effective part; the invention primarily consisting in the way the butterfly wing is applied between the backing and the facing to hold it in position and to protect it against damage.

If it is desired to use a backing of neither transparent nor translucent material it may be advantageous to place a picture or the like of uniform surface on the uniformly surfaced backing and subsequently place the butterfly wing or the like at desired positions on the picture and thereafter apply the transparent facing to the butterfly wing, picture, and backing and subsequently effect intimate connection between the parts by adhesive with the exception of the butterfly wing or the like as in the manner hereinbefore described.

The invention in two forms, differing only in additional decoration to the butterfly wing, is represented by the accompanying sheets of drawings, Figs. 1 to 5 showing one form and Figs. 6 to 9 another form.

Figs. 1 and 2 are front views of partly finished pictures.

Fig. 3 is a section of Fig. 1 on the dotted lines A—B.

Fig. 4 is a section of Fig. 2 on the dotted lines C—D.

Fig. 5 is a front view of the finished picture.

Figs. 6, 7 and 8 are front views, and

Fig. 9 is a section of Fig. 8 on the dotted lines E—F.

With reference to Figs. 1 to 5, *a* is a backing of any suitable material, and *c* is a piece of real butterfly wing laid upon the face of the backing, while *d* is a transparent sheet constituting a facing applied to the backing to cover the butterfly wing, this facing sheet being permanently attached to the backing by adhesive all round and beyond the butterfly wing, so that ultimately the butterfly wing is tightly enclosed within a space between the backing and facing in an air-tight and immovable manner.

The backing *a* is of translucent material such as imitation ivory or pearl tissue or sheet, while the facing sheet *d* is of very thin celluloid.

The decoration to complete the picture is usually hand painting or stencilling, and may be applied to the front of the celluloid facing and to the back of the backing, or to one of these surfaces only; the essential feature of the invention being that the butterfly wing is effectively enclosed between the backing and the facing sheet for utilization as part of the picture.

It will be quite understood that any number of pieces of butterfly wing can be applied between the backing and the facing sheet, and it may be necessary in their application to spot the extreme boundary of the wing with adhesive just to hold the butterfly wing in position on the backing while the facing sheet is permanently placed in position.

The form of the invention Figs. 6 to 9 differs only from the previous form in respect of the subsequent decoration. *a* is the backing, *c* is the butterfly wing and *d* is the facing sheet, but in addition the presented surface is built up around the boundary of the facing sheet with a thin layer of cement, indicated at *e*, which when solidified sets itself to the backing and lies partly over the facing sheet and forms additional security of the facing sheet, or the means for securing the facing sheet over and around the butterfly wing, the latter being still enclosed within a space between the backing and the facing sheet in an air-tight and immovable manner.

In Figs. 3, 4 and 9 of the drawings the thicknesses of material have been exaggerated for convenience of illustration, the picture itself being generally speaking fairly thin, although the backing in Figs. 6 to 9 may be of wood or thick cardboard.

The finished picture in the form Figs. 6 to 9 is intended to bear decoration on the cement layer and also on the exposed facing sheet in imitation of the well-known Japanese ware.

Having now described my invention, what I claim and desire to secure by Letters Patent is—

1. A decorative article comprising, in combination, a backing having a uniform surface, butterfly wing disposed on said surface, a transparent facing sheet having a uniform surface applied over said butterfly wing, an adhesive applied to adjacent surfaces of said backing and facing sheet to secure the same together, said adhesive terminating at the boundary of said butterfly wing to form an air-tight pocket in which said wing is encased in flat condition, and a decoration on the exterior surface of said facing sheet.

2. A decorative article, comprising in combination a backing having a uniform surface, said backing being of translucent material, butterfly wing disposed on said surface, a transparent facing sheet having a uniform surface applied over said butterfly wing, an adhesive applied to adjacent surfaces of said backing and facing sheet to secure the same together, said adhesive terminating at the boundary of said butterfly wing to form an air-tight pocket in which said wing is encased in flat condition, and a decoration on the exterior surface of said facing sheet.

In testimony whereof I have affixed my signature.

DORIS SORGE.